June 29, 1937.  W. J. WOODS  2,085,245
DRAWING GLASS
Filed Oct. 22, 1930   3 Sheets-Sheet 1

INVENTOR
WILLIAM J. WOODS.
BY
ATTORNEY

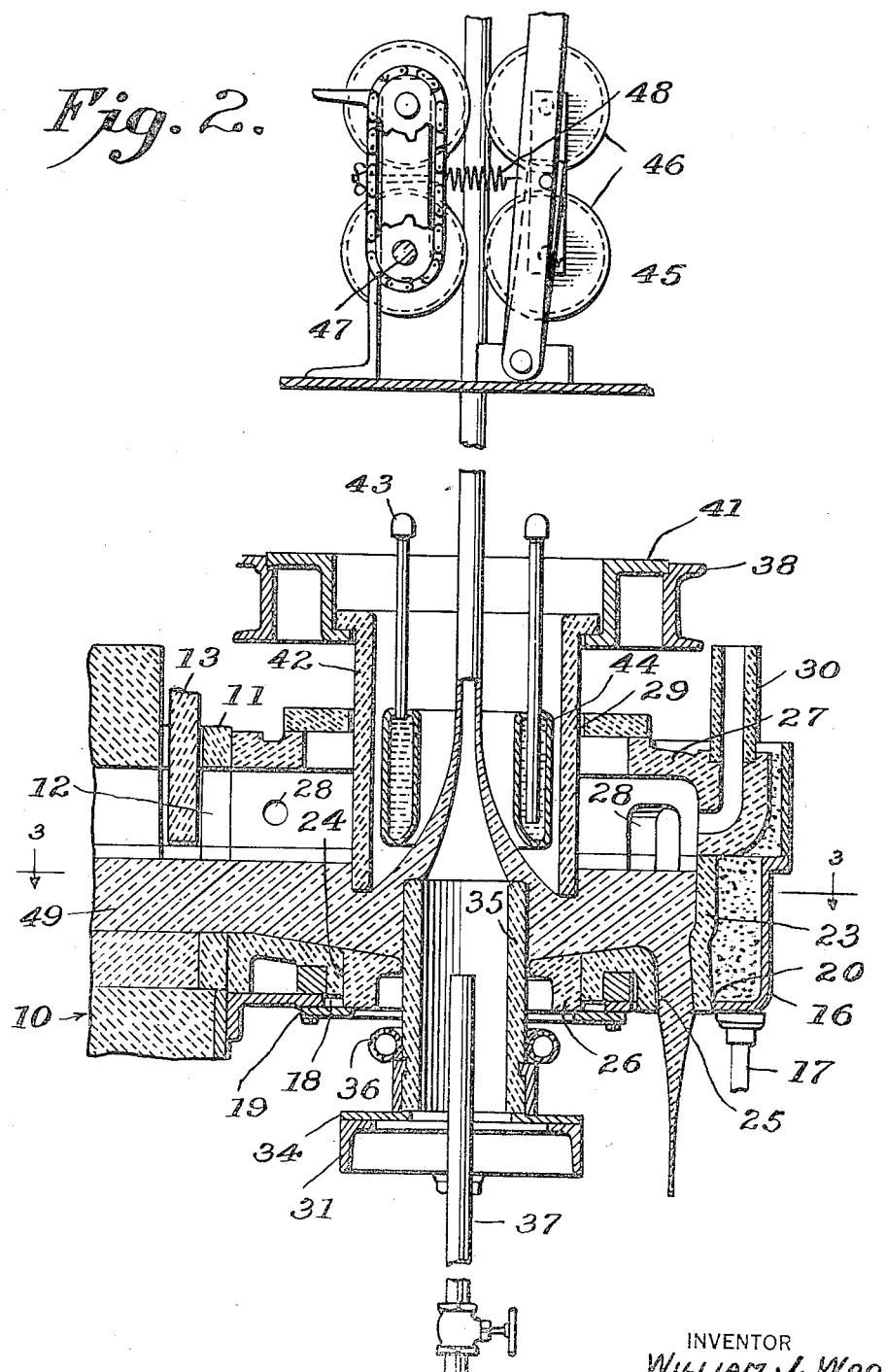

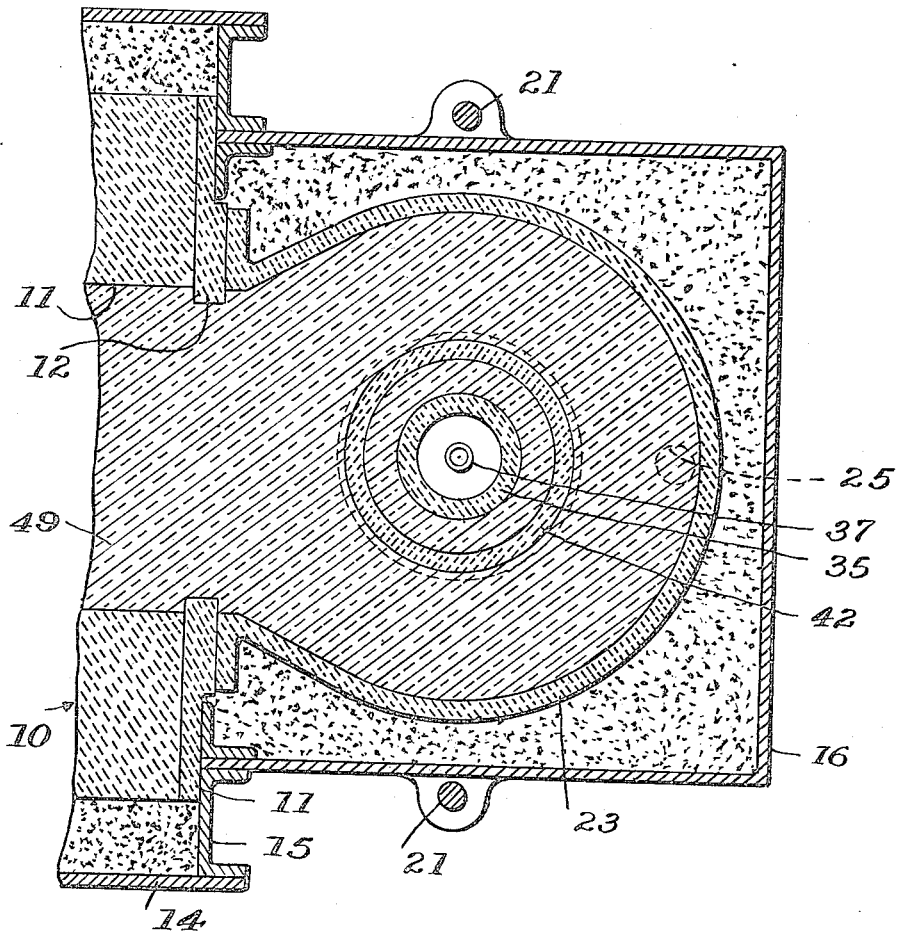

Patented June 29, 1937

2,085,245

UNITED STATES PATENT OFFICE 2,085,245

DRAWING GLASS

William J. Woods, Corning, N. Y., assignor to Corning Glass Works, Corning, N. Y., a corporation of New York Application October 22, 1930, Serial No. 490,525

7 Claims. (Cl. 49—17.1)

This invention relates to a method of and means for drawing glass and more particularly to the production of glass tubing.

It has been proposed to draw glass upwardly from a pool of molten glass for the formation of sheets, cylinders and tubes, as in my Patent No. 1,829,429 issued on an application filed April 9, 1929 of which this application is a continuation in part. I employ a nipple which is fixed as to height with the result that all adjustments for varying the dimensions of the cylinder or tube must be made by changing the vertical position of the conditioning sleeve, the flow of air through the nipple, etc. Further, when the surface of the molten glass recedes with respect to the nipple, the dimensions of the cylinder or tube may be changed. In the prior art, the molten glass flowing from the furnace into the container from an inlet at one side thereof, divides into two streams which flow around the central nipple and converge opposite the inlet. This causes a concentration of slag, coloring matter or other impurities at the part of the bowl opposite the inlet which enters the wall of the tube and causes a streak in the finished product. Moreover, when the temperature of the rest of the glass in the drawing bowl is correct for drawing tubing, the glass opposite the inlet, due principally to the fact that it is remote from the heating flames, is apt to be cooler and may crystallize and cause serious defects in the tube.

It is the object of my invention to continually and rapidly produce tubing of accurate dimensions free from defects mentioned above.

Another object is to maintain a precise control over the diameter and wall thickness of said tubing.

The above and other objects may be accomplished by employing my invention which embodies among its features the drawing of tubing upwardly from a pool of molten glass in which a nipple having a relatively large bore is wholly submerged. This nipple acts to slightly cool the glass which immediately surrounds it and thus provides a root or foundation of glass which is slightly more viscous than the remainder of the glass in the pool. When by means of a suitable bait this foundation is drawn upwardly, it serves as a skeleton to which some of the glass between the top of the nipple and the surface of the pool will adhere so as to build up the wall of the tube to the proper thickness. Other features include the control of the temperature of the glass surrounding the skeleton between the nipple and the sleeve, with the resultant control of the wall thickness of the tube and the preserving of the temperature of the skeleton sufficiently high at the point where it leaves the nipple to enable any faults or streaks formed on its inside surface by contact with the nipple to disappear before the tube has completely set. Other features include the adjustment of the nipple as to height, by which I obtain a precise regulation of the size of the bore, and a closable drain aperture in the glass container through which I drain off the discolored or crystallized glass which is unfit for use in the finished product.

Although the following disclosure relates to tube drawing apparatus, my invention is capable of a wider range of application and may be used in the production of many varieties of drawn glass articles.

In the drawings:

Fig. 2 is a sectional view along the line 2—2 of Fig. 1;

Fig. 3 is a horizontal sectional view taken on the line 3—3 of Fig. 2; and

Figures 1, 4:
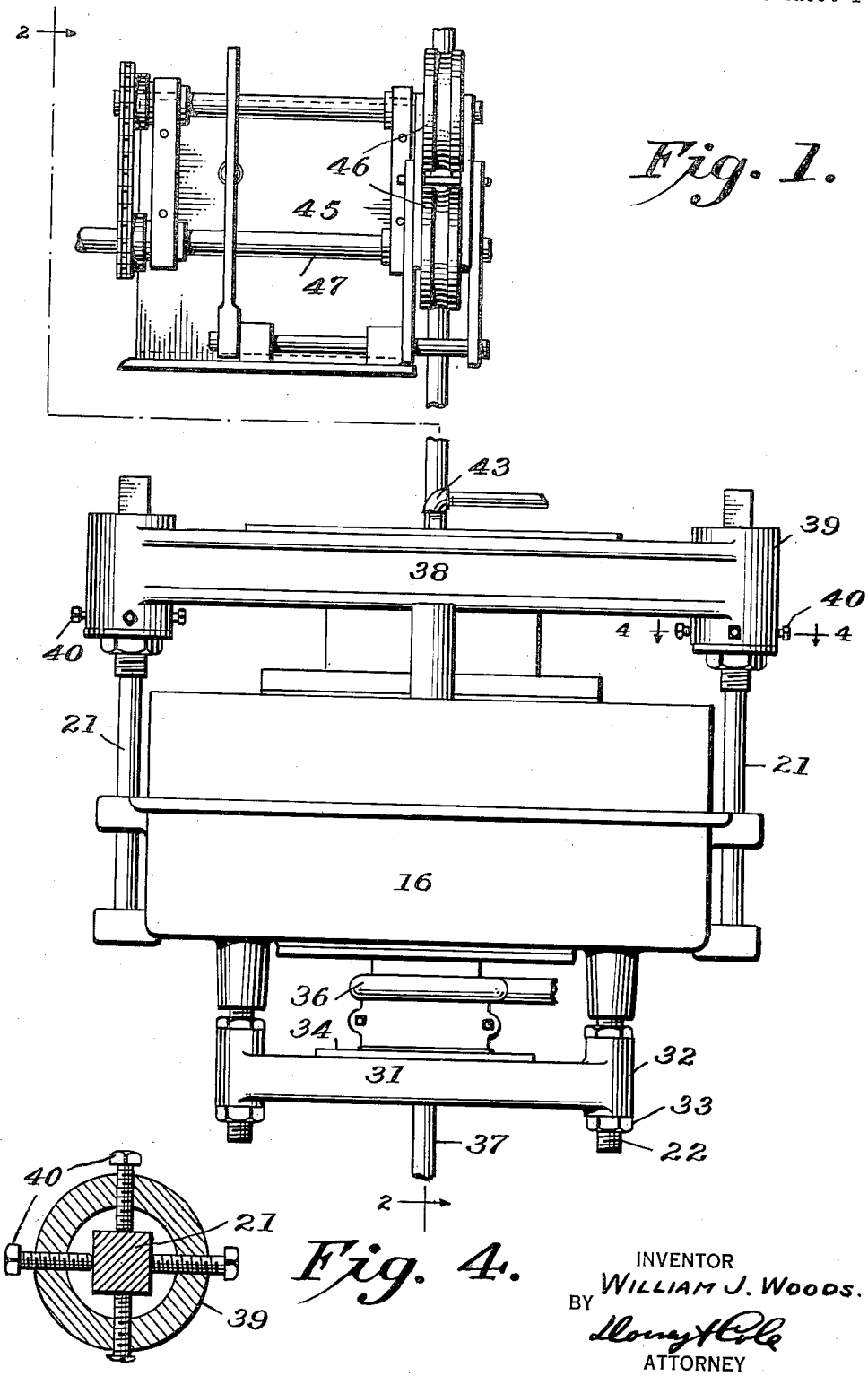
Fig. 1 is a front view of my apparatus.
Fig. 4 is a sectional view taken along the line 4—4 of Fig. 1.

Referring to the drawings in detail, the furnace 10 (shown only partially) consists of side and front refractory walls 11; the front wall having an aperture 12 which acts as an outlet for the molten glass. A gate 13 is supported by a suitable structure adjacent to the aperture 12 so that it may be adjusted to control the flow of glass therefrom.

The side walls 11 of the furnace are flanked by plates 14, separated from the walls by a suitable insulating material. Flanged plates 15 are made fast to the front edges of plates 14 and rest against the front wall of the furnace, providing a support for one end of a casing 16 in which a drawing bowl is situated.

This casing 16 is preferably of sheet metal and is securely fastened at one end by means of flanges to the plates 15 and the end remote from the furnace is supported by suitable legs 17. The bottom of the casing has a circular opening 18 in the center thereof and removably secured to and underlying the edge of the opening 18 is an annular member 19. A drain opening 20 is formed near the forward end of the casing as shown in Fig. 2. Secured by means of brackets to either side of the casing is a standard 21, the upper portion of each of which is square in cross-section. Depending from the bottom of the casing 16 are screw threaded members 22 whose function is to be more fully described hereinafter.

A bowl 23 of refractory material is supported on the bottom of the casing and the space between the sides of the bowl and the wall of the casing is filled with insulating material. The bowl communicates with the interior of the furnace through an inlet which coincides with the aperture 12 in the casing and formed in the bottom of the bowl is a circular opening 24 which aligns with the opening 18 of the casing 16. A smaller orifice 25 is formed in the bowl 23 and is surrounded by a tubular projection which extends through the opening 20 of the casing. A refractory ring 26 fits in the opening 24 and is held in place by the annular member 19 and the bowl is provided with a refractory cover 27 which has ports 28 in the sides thereof, a circular opening 29 in its center, and a vent 30 at one end.

The screw threaded members 22, depending from the bottom of the casing, carry a framework comprised of two girders 31 which diverge at their midpoints and are made integral at their ends with collars 32 which are adjustably held on the members 22 by means of nuts 33. Supported on the girders by means of platform 34 is a refractory nipple 35 which extends snugly but movably through the ring 26 into the interior of the bowl. A gas burner 36 is positioned around the nipple and an air line 37 extends upwardly into the nipple 35 for a purpose to be hereinafter described.

Supported above the bowl on the standards 21 is a similar framework which consists of channel members 38 which are made integral at their ends to collars 39. Set screws 40 in the collars engage the square portions of standards 21 and enable this framework to be adjusted both vertically and horizontally. The diverging channel members carry between them a flanged ring 41 in which a sleeve 42 is supported. This sleeve depends into the interior of the bowl through the opening 29 in concentric relation with the nipple 35 and suspended in this sleeve from a suitable support (not shown) by means of water lines 43, is a cooling device which consists of a water jacket 44.

Positioned at a suitable distance above the bowl is the drawing mechanism 45. This consists of grooved wheels 46 which are driven through shaft 47 by a suitable source of power and are held in engagement with the finished tube by spring 48.

When the device is in operation, glass 49 flows through the inlet 12 into the bowl 23. The vertical position of the conditioning sleeve 42 may be adjusted and held by set screws 40 so that the lower edge of the sleeve is in the suitable position relative to the surface of the glass to produce tubing of the desired size and the sleeve may also be adjusted laterally and centered relative to the nipple 35 by set screws 40. The glass which is chilled by coming into contact with the nipple forms a skeleton of glass which may be engaged by a suitable bait and drawn upwardly. As this skeleton passes through the glass between the top of the nipple and the surface of the glass in the bowl, enough of the glass adheres to this skeleton to build up the wall of the tube. The tube so formed passes through the conditioning sleeve 42 and cooling device 44, and is then engaged by pulling wheels 46 which are run at the necessary speed to give the desired results. The size of the bore may be regulated by the vertical adjustment of the nipple, raising the nipple gives the tube a large bore while lowering the nipple tends to make the bore smaller. This adjustability is provided by the lock nuts 33. The size of the bore may also be regulated by the rate of flow of the air through the air line 37, and the size of the tube or the thickness of the walls may be regulated by the speed of rotation of the wheels 46, the temperature maintained in the conditioning sleeve, and the vertical position of the sleeve. It will further be seen that a smaller ring may replace the ring 26 so that a smaller nipple may be used when the size of the tubing to be drawn warrants this change. Burner 36 is used primarily to melt the frozen glass between the nipple 35 and the ring 26 when it is desired to adjust the nipple, but may also be used to regulate the temperature of the nipple and the air flowing therethrough to give the inside surface of the tube, after it leaves the nipple, the necessary temperature to heal up any striations which might be formed on said surface by contact with the nipple. Thus I have a wide range of temperature variation, and by means of the rate of flow of air through the nipple may also control the temperature of the glass in the vicinity of the nipple to produce the best results.

It has been found that any glass which crystallizes or becomes discolored by contact with the sides of the bowl will collect at the side of the bowl opposite the inlet, in the vicinity of the orifice 25 shown in Fig. 3. This orifice may be closed by a suitable plug so that by removing the plug I am enabled to drain off this objectionable matter and prevent it from entering the wall of the tube and forming streaks or other imperfections in the finished product.

I do not wish to be limited to the specific construction set forth above, but only to the scope of the appended claims.

What I claim is:

1. An apparatus for drawing tubing from a pool of molten glass which includes a means for preserving a selected area of the surface of said pool at a predetermined temperature and means wholly submerged below the surface of the glass within the selected area for forming a skeleton of glass to which glass from the selected area adheres and builds up the wall of the tubing.

2. An apparatus for drawing tubing from a pool of molten glass which includes a sleeve for preserving a selected area of the surface of said pool at a predetermined temperature and means wholly submerged below the surface of the glass within the selected area for forming a skeleton of glass to which glass from the selected area adheres and builds up the wall of the tubing.

3. The method of making tubing from a pool of molten glass which includes forming a skeleton of glass below the surface of said pool and drawing it upwardly through a preconditioned area on the surface of said pool.

4. The method of drawing tubing from a pool of molten glass which includes chilling a portion of the glass which lies wholly below the surface of the pool and drawing said chilled portion upwardly through a preconditioned area on the surface of the pool.

5. The method of drawing tubing from a pool of molten glass which includes continuously forming a skeleton of glass below the surface of said pool and continuously drawing said skeleton upwardly.

6. The method of drawing tubing from a pool of molten glass which includes continuously chilling a portion of the glass which lies wholly below the surface of said pool and drawing the chilled glass upwardly.

7. The method of making tubing which includes preserving a selected area of the surface of a pool of molten glass at a predetermined temperature, cooling a submerged portion of the molten glass to form a skeleton and drawing the skeleton upwardly through the selected area.

WILLIAM J. WOODS.